United States Patent [19]

Lattin, Jr.

[11] Patent Number: 5,099,137
[45] Date of Patent: Mar. 24, 1992

[54] LOOPBACK TERMINATION IN A SCSI BUS

[75] Inventor: Thomas W. Lattin, Jr., Houston, Tex.

[73] Assignee: COMPAQ Computer Corporation, Houston, Tex.

[21] Appl. No.: 612,309

[22] Filed: Nov. 13, 1990

[51] Int. Cl.⁵ .................. H01B 11/00; H05K 1/14
[52] U.S. Cl. ................... 307/147; 361/394; 361/414
[58] Field of Search ............ 333/22 R; 361/393, 394, 361/395, 407, 414, 428; 307/147

[56] References Cited

U.S. PATENT DOCUMENTS 4,988,890  1/1991  Narhi et al. ................ 307/147

FOREIGN PATENT DOCUMENTS 56-79551  6/1981  Japan ...................... 333/22 R Primary Examiner—Leo P. Picard
Assistant Examiner—Michael W. Phillips
Attorney, Agent, or Firm—James R. Burdett; Christopher D. Keirs

[57] ABSTRACT

A small computer system interface (SCSI) bus between a host system and one or more peripheral devices is terminated at one end of the SCSI bus, proximal to the host system, and at the other end of the SCSI bus by a loopback terminator. The loopback terminator is formed by a signal board with one connector that is adapted for receiving signals from the SCSI bus, a multiconductor cable having a pair of ends, a pair of cable connectors, each of which is adapted to mate with respective ends of the multiconductor cable, and a terminator coupled to one of the cable connectors. One or more of the peripheral devices are connected to the multiconductor cable via respective nodes, and the multiconductor cable is routed back to the signal board coupled to form a "loop" between the pair of cable connectors.

2 Claims, 2 Drawing Sheets

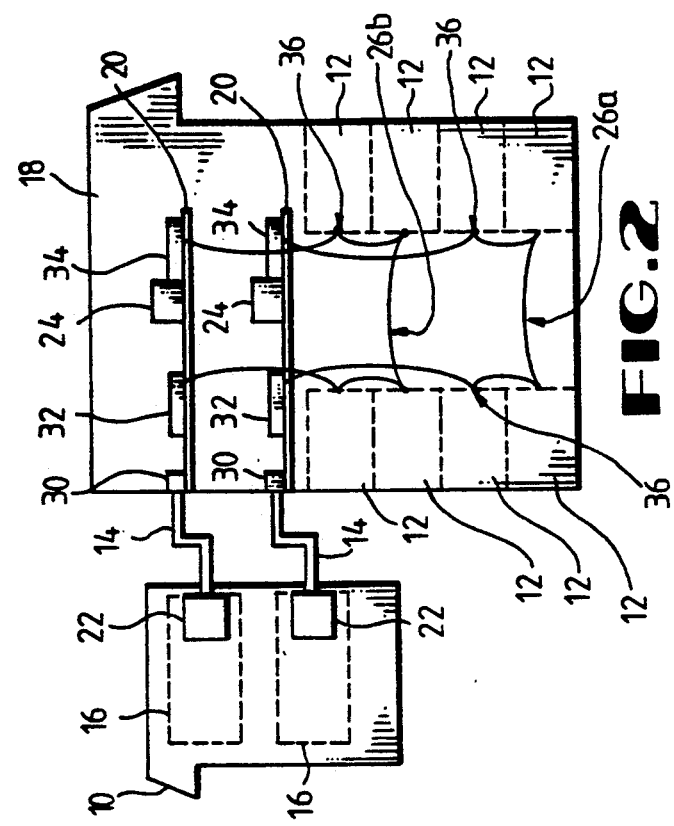
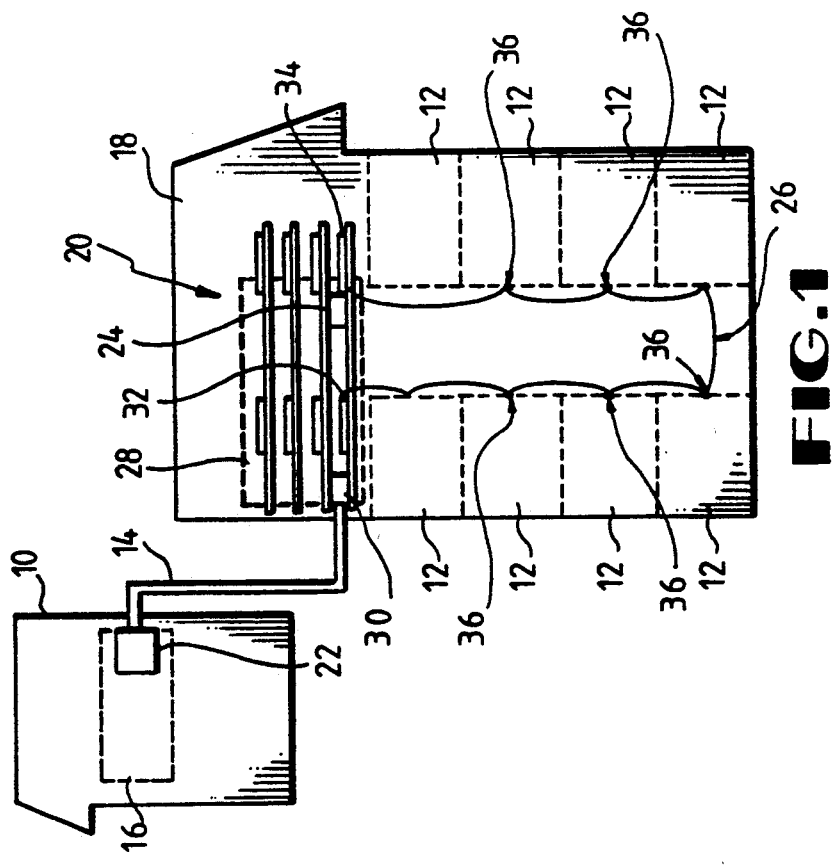

LOOPBACK TERMINATION IN A SCSI BUS

CROSS REFERENCE TO RELATED APPLICATIONS

This application is related to the following copending and commonly assigned applications: "Disk Array Controller With Parity Capabilities", Ser. No. 431,735, filed Nov. 3, 1989, "Bus Master Command Protocol", Ser. No. 431,737, filed Nov. 3, 1989, as well as "Disk Controller With Separate Data and Command Paths", Serial No. 07/612,135, filed Nov. 12, 1990, each of which is incorporated herein by reference.

BACKGROUND OF THE INVENTION

1. Field of the Invention

This invention relates generally to small computer system interfaces (SCSI), and more particularly to methods and apparatus for terminating a SCSI bus.

2. Statement of the Prior Art

Intelligent drive arrays are well known. For example, the COMPAQ SYSTEMPRO Personal Computer System which is manufactured by the assignee of the present invention offers the flexibility to be configured to meet a wide range of user needs, and is available in several standard model configurations each of which includes an intelligent drive array controller that is adaptable to two-drive, four-drive, six-drive and eight-drive arrays. Further information regarding a COMPAQ SYSTEMPRO Personal Computer System can be found in *Technical Reference Guide: COMPAQ SYSTEMPRO Personal Computer System.* Volumes I and II, Compaq Computer Corporation (1989).

The drive arrays which are used in such personal computer systems often employ a SCSI. As should be well known to those of ordinary skill in the art, SCSI's comprise a byte-wide data bus with an optional parity bit and nine signals to control data transfers between peripheral devices and a host system, among multiple peripheral devices, and among multiple host systems. Each host system has a host adaptor (i.e., a device which couples the host system to the SCSI bus and performs lower levels of SCSI protocol) which normally acts as an "initiator", to request an I/O process to be performed by another SCSI device known as a "target". Targets may comprise other host adapters or controllers that couple the peripheral devices to the SCSI bus.

SCSI devices (whether they are initiators or targets) are daisy-chained together, typically with a common, 50-conductor "A" cable. Alternatively, they may be daisy-chained together using a 68-conductor "B" cable. Both ends of either cable are terminated for two basic reasons: (1) to prevent noise by maintaining a high signal-to-noise ratio and (2) to maintain the SCSI bus in a known state. Further information regarding termination may be found in the American National Standard "Small Computer System Interface", ANSI X3.131-1986 or the draft proposed American National Standard "Small Computer System Interface", ANSI X3.131-198X.

The simplest prior art approach for terminating a SCSI bus has been to plug a cable adaptor containing terminating resistors for each wire into the unused port of the end device. When the end device is removed from the chain or moved to a different place on the chain, then the cable adaptor must be removed from the moved device and connected to the unused port of the end device.

The second approach has been to include a removable package of terminating resistors in a socket on the printed circuit (PC) board of the device. By removing an access panel on the device, the package can be reached and manually pulled off or pushed into the socket on the PC board depending on the location of the device on the chain.

These two approaches have the drawback that the resistors are in a separate unit which must be manipulated and stored independently of the device. In addition, the cable adaptor is generally packaged, sold and shipped separately from the devices which greatly increases its cost. The removable resistor package requires the device user to open up an access panel on the device housing, locate the terminating resistors and replace them at the last device on the chain. See also, for example, U.S. Pat. No. 4,920,339.

SUMMARY OF THE INVENTION

A small computer system interface (SCSI) bus between a host system and one or more peripheral devices is terminated at one end of the SCSI bus, proximal to the host system, and at the other end of the SCSI bus by a loopback terminator. The loopback terminator is formed by a signal board with one connector that is adapted for receiving signals from the SCSI bus, a multiconductor cable having a pair of ends, a pair of cable connectors, each of which is adapted to mate with respective ends of the multiconductor cable, and a terminator coupled to one of the cable connectors. One or more of the peripheral devices are connected to the multiconductor cable via respective nodes, and the multiconductor cable is routed back to the signal board coupled to form a "loop" between the pair of cable connectors.

Other objects, advantages and novel features according to this invention will become readily apparent from the following detailed description thereof, when considered in conjunction with the accompanying drawings wherein:

BRIEF DESCRIPTION OF THE DRAWINGS

FIG. 1 is a block diagram illustrating one embodiment of loopback termination according to the present invention;

FIG. 2 is a block diagram illustrating another embodiment of loopback termination according to the present invention.

DETAILED DESCRIPTION OF THE INVENTION

Figure 3:
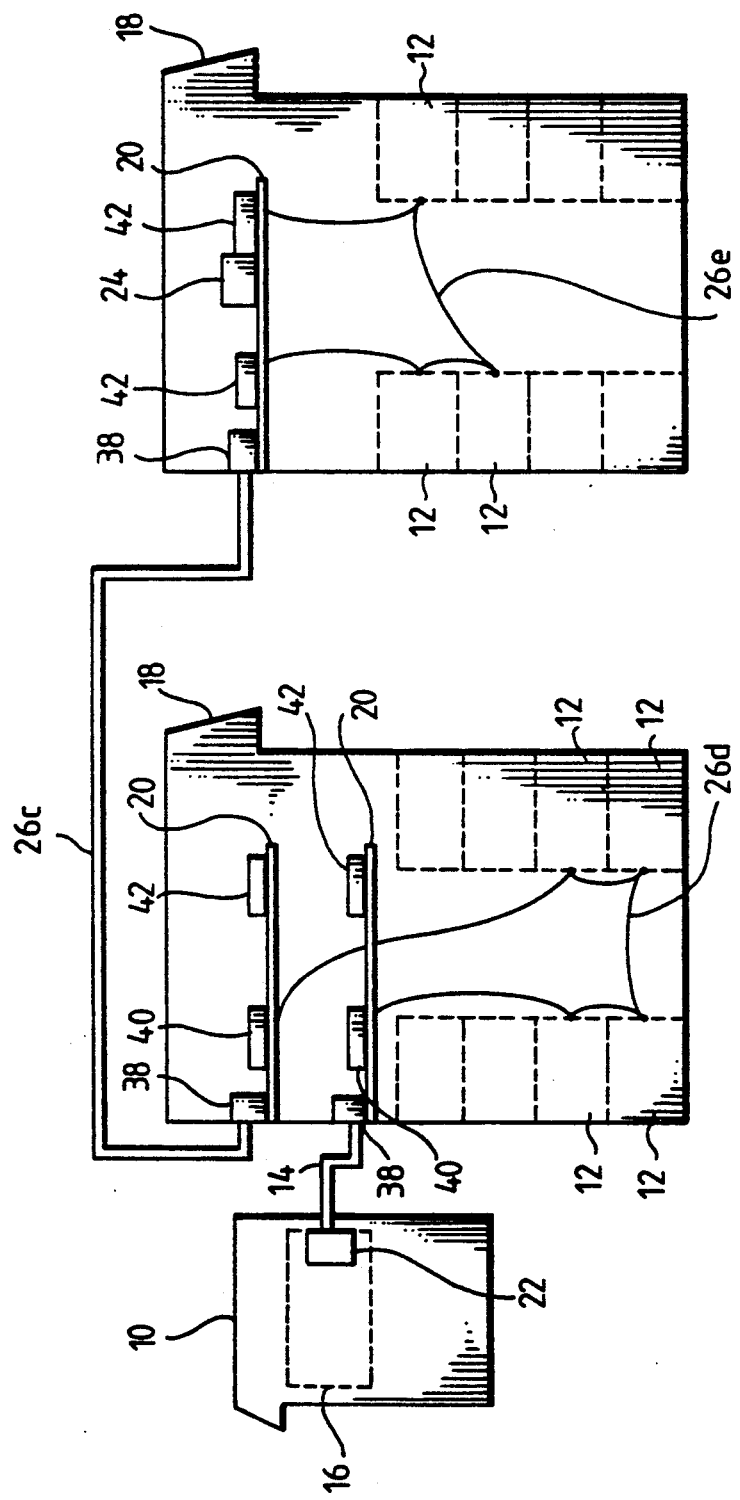
FIG. 3 is a block diagram illustrating a third embodiment of loopback termination according to the present invention.

Referring now to the drawings, wherein like numbers designate like or corresponding parts throughout each of the several views, there is shown in FIG. 1 one embodiment of loopback termination according to the present invention. As is well known, a host computer 10 (e.g., a COMPAQ SYSTEMPRO Personal Computer System which is manufactured by the assignee of the present invention) is typically coupled to a plurality of peripheral devices 12 by a SCSI bus 14. Each end of the SCSI bus 14 must be terminated to prevent noise by maintaining a high signal-to-noise ratio and to maintain the SCSI bus 14 in a known state. Manufacturers of equipment used in such an environment, therefore, comply with the provisions of the American National Standard "Small Computer System Interface", ANSI X3.131-1986 or the draft proposed American National Standard "Small Computer System Interface", ANSI X3.131-198X.

Accordingly, the host computer 10 includes controller means 16 for controlling the transfer of data to and from the peripheral devices 12 and the host computer 10. Preferably, controller means 16 is compatible with the register set and command passing protocol disclosed in the above-referenced "Bus Master Command Protocol", Ser. No. 431,737, filed Nov. 3, 1989. It does not, however, support all of the configuration options or fault tolerant features of an intelligent drive array 18 which encloses the peripheral devices 12 (e.g., disk drives) and incorporates such protocol. Instead, it provides high-performance access to a large amount of disk storage while using only one EISA slot. The controller means 16 is capable of efficiently managing access of up to seven SCSI drives 12, on a single SCSI bus 14, and will allow those disks in the drives 12 to be presented to the system as a unique volume or as a number of disk drives. Further information regarding the controller means 16 may be found in copending "Disk Controller With Separate Data and Command Paths", Ser. No. 07/612,135, filed Nov. 12, 1990.

The loopback terminator shown in FIG. 1 includes first means for coupling 16 the host computer 10 to SCSI bus 14, second means 20 for coupling the one or more peripheral devices 12 to the SCSI bus 14, first terminator means 22 for terminating the SCSI bus 14 proximal to the first coupling means 16, second terminator means 24 for terminating the SCSI bus at the second coupling means 20, and cable means 26 for coupling the one or more peripheral devices 12 together in a loop to the second coupling means 20.

Preferably, the first coupling means comprises controller means 16. The SCSI bus 14 typically comprises a 68-pin cable that is coupled to a signal board comprising the second coupling means 20. Signal board 20 may be a single-ended board having single-ended drivers and receiver, but it preferably is a differential signal board, having differential drivers and receivers, which is installed in one of four slots which are provided on an interface board 28. Accordingly, a first cable connector 30 is attached to the differential signal board 20, adapted to receive a plurality of signals from the SCSI bus 14. A second cable connector 32 is then coupled to receive the plurality of signals from the first cable connector 30, and is adapted to mate with an end of cable means 26. Thereafter, a third cable connector 34 is connected to the second terminating means 24, and is adapted to mate with the other end of the cable means 26, thereby terminating the SCSI bus 14. Cable means 26, in a presently preferred embodiment of this invention, comprises a seven-connector, 50-pin SCSI bus cable with a plurality of connection nodes 36 for coupling respective ones of the one or more peripheral devices 12 within the loop.

As should be readily apparent from the foregoing description, the first terminator means 22 is ideally provided on the controller means 16. Second terminator means 24, likewise, is ideally mounted on the differential signal board 20. Both terminating means should provide terminating resistance of from between 90 ohms to 140 ohms, preferably about 122 ohms.

Referring now to FIG. 2, another embodiment of loopback termination according to the present invention is shown. In the embodiment shown in FIG. 2, host computer 10 includes a pair of controller boards 16, each of which is coupled to the intelligent drive array 18 by a 68-pin external shielded signal cable. Each of the cables comprise a SCSI bus 14 which is connected to one of the differential signal boards 20 installed in intelligent drive array 18. Accordingly, a first cable connector 30 is attached to each differential signal board 20, adapted to receive a plurality of signals from the SCSI bus 14. Second cable connectors 32 are, similarly, coupled to receive the plurality of signals from the first cable connectors 30, and are adapted to mate with an end of cable means 26. Thereafter, third cable connectors 34 are also connected to the second terminating means 24, and are adapted to mate with the other end of the cable means 26, to terminate both SCSI busses 14. As shown in FIG. 2, cable means 26 comprises a pair of cables, one 26a of which is a seven-connector, 50-pin SCSI bus cable with a plurality of connection nodes 36 for coupling respective ones of the one or more peripheral devices 12 within the loop, while the other 26b of which preferably comprises a four-connector, 50-pin signal cable. It should be readily apparent from FIG. 2 that similar configurations may exist where the controller boards 12, the differential signal boards 20, and the plurality of peripheral devices 12 are in separate enclosures. That is, a pair (or more) of host computers 10, each of which includes a controller board 16, may be respectively connected to a pair of intelligent drive arrays 18, each containing one or more peripheral devices 12, without departing from the scope of the embodiment shown in FIG. 2.

Referring now to FIG. 3, a third embodiment of loopback termination according to the present invention is shown. In FIG. 3, cable means 26 comprises at least three multiconductor cables 26c, 26d and 26e, each of which have a pair of ends. Accordingly, the second coupling means 20 comprises at least three differential signal boards. First cable connector means 38 having three cable connectors of a first type are provided to receive the plurality of signals from the SCSI bus 14, each cable connector of the first type being mounted upon a respective one of the differential signal boards 20. Second cable connector means 40 having three cable connectors of a second type are also provided Each of the three cable connectors of a second type is adapted to mate with an end of the multiconductor cables, and one of those cable connectors of the second type is mounted upon the first differential signal board 20. The other two cable connectors of the second type are mounted, respectively, upon the second and third ones of the differential signal boards 20. Third differential signal board 20 has the second terminating means 24 mounted on it.

The first one 26c of the multiconductor cables has an equal number of conductors (i.e., 68) as the SCSI bus 14, and a second one 26d of the multiconductor cables is connected between the first and second differential signal boards 20 by the second cable connector means 40. Furthermore, the first multiconductor cable 26c is connected between the second differential signal board 20 at its respective first cable connector means 38 and the first cable connector means 38 attached to the third differential signal board 20. Also provided are third cable connector means 42 for coupling a third one 26e of the multiconductor cables to the second terminating means 24 that is mounted upon the third differential signal board 20. The third one 26e of those multiconductor cables is connected between the first cable connector means 38 and the third cable connector means 42 on the third differential signal board 20.

Obviously, many modifications and variations of the invention are possible in light of the foregoing teachings. For example, the second terminating means 24 in the embodiments shown in FIGS. 2 and 3 may comprise a terminating network with a resistance of about 90 ohms to about 140 ohms, preferably 122 ohms. Furthermore, the schemes which have been taught above are adaptable to a fast SCSI bus or a wide SCSI bus. It should be understood, therefore, that within the scope of the appended claims the present invention may be practiced otherwise than a is specifically described herein.

I claim:

1. A small computer system interface (SCSI) for connection between a host computer and one or more peripheral devices comprising:
   a controller for controlling one or more peripheral devices, said controller being electrically connectable to the host computer and comprising a first set of terminating resistors;
   a signal board physically remote from the host computer and comprising a second set of terminating resistors, a first cable connector, a second cable connector and a third cable connector with said first cable connector in electrical communication with said second cable connector and with said third cable connector in electrical communication with said second set of terminating resistors;
   a first cable electrically connecting the controller to the signal board via the first cable connector;
   a second cable having a first end, a second end and at least one electrical connector situated between the first end and the second end for electrical connection to a peripheral device, said first end connected to the second cable connector of the signal board and said second end connected to the third cable connector of the signal board.

2. A small computer system interface (SCSI) for connection between a host computer and two or more peripheral devices comprising:
   a controller for controlling two or more peripheral devices, said controller being electrically connectable to the host computer and comprising a first set of terminating resistors;
   a first signal board physically remote from the host computer and comprising a first cable connector, a second cable connector with said first cable connector in electrical communication with said second cable connector;
   a first cable electrically connecting the controller to the first signal board via the first cable connector;
   a second signal board comprising a third cable connector and a fourth cable connector with said third cable connector in electrical communication with said fourth cable connector;
   a second cable having a first end, a second end and at least one electrical connector situated between the first end and the second end for electrical connection to a first peripheral device said first end connected to the second cable connector of the first signal board and said second end connected to the fourth cable connector of the second signal board;
   a third signal board physically remote from both the host computer and the second signal board and comprising a fifth cable connector, a sixth cable connector, a seventh cable connector, and a second set of terminating resistors with said seventh able connector in electrical communication with said second set of terminating resistors and with said fifth cable connector in electrical communication with said sixth cable connector;
   a third cable electrically connecting the third cable connector on the second signal board to the fifth cable connector on the third signal board; and,
   a fourth cable having a first end, a second end and at least one electrical connector situated between the first end and the second end for electrical connection to a second peripheral device said first end connected to the sixth cable connector of the third signal board and said second end connected to the seventh cable connector of the third signal board.

* * * * *